US009853495B2

(12) United States Patent
Takizawa (10) Patent No.: US 9,853,495 B2
(45) Date of Patent: Dec. 26, 2017

(54) DISCHARGE CIRCUIT, INFORMATION PROCESSING APPARATUS, DISCHARGE METHOD, AND STORAGE MEDIUM

(71) Applicant: CANON KABUSHIKI KAISHA, Tokyo (JP)

(72) Inventor: Masahiro Takizawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 14/553,896

(22) Filed: Nov. 25, 2014

(65) Prior Publication Data
US 2015/0155744 A1 Jun. 4, 2015

(30) Foreign Application Priority Data
Nov. 29, 2013 (JP) .................................. 2013-247400

(51) Int. Cl.
*H02J 1/10* (2006.01)
*H02J 9/06* (2006.01)
*H02J 7/00* (2006.01)
*G06F 1/26* (2006.01)
*G03G 15/00* (2006.01)
*H02J 7/34* (2006.01)

(52) U.S. Cl.
CPC .......... *H02J 9/061* (2013.01); *G03G 15/5004* (2013.01); *G03G 15/80* (2013.01); *G06F 1/263* (2013.01); *H02J 7/007* (2013.01); *H02J 7/345* (2013.01); *Y10T 307/344* (2015.04)

(58) Field of Classification Search
CPC .................................... H02J 3/383; H02J 1/00
See application file for complete search history.

(56) References Cited

U.S. PATENT DOCUMENTS

| 4,670,706 A * | 6/1987 | Tobita | G05F 3/24 323/313 |
| 5,786,975 A * | 7/1998 | Duncan | H02H 5/005 250/505.1 |
| 6,107,698 A * | 8/2000 | Ochiai | H02J 9/005 307/43 |
| 6,424,058 B1 * | 7/2002 | Frech | G01R 27/2605 307/109 |

(Continued)

FOREIGN PATENT DOCUMENTS

| CN | 101090230 A | 12/2007 |
| CN | 201985519 U | 9/2011 |

(Continued)

*Primary Examiner* — Jared Fureman
*Assistant Examiner* — Esayas Yeshaw
(74) *Attorney, Agent, or Firm* — Canon U.S.A., Inc. IP Division (57) ABSTRACT

A discharge circuit for a decoupling capacitor to stabilize a voltage supplied from a first power supply unit to a first load includes a first capacitor, a first switch, and a discharge control circuit. The first capacitor is charged by power supplied from a second power supply unit that supplies power to a second load that is different from the first load. The first switch is arranged between the decoupling capacitor and ground. The discharge control circuit discharges, in a case where power supplied from the second power supply unit to the second load is cut off, charges of the decoupling capacitor to the ground by driving the first switch using charges stored in the first capacitor.

13 Claims, 6 Drawing Sheets

(56) References Cited

U.S. PATENT DOCUMENTS

| | | | |
|---|---|---|---|
| 9,166,497 B2* | 10/2015 | Fujii | H02M 3/33507 |
| 2003/0058012 A1* | 3/2003 | Matsushita | H03K 17/223 |
| | | | 327/143 |
| 2003/0142164 A1* | 7/2003 | Nishida | B41J 29/393 |
| | | | 347/19 |
| 2009/0284081 A1* | 11/2009 | Huang | H05K 9/0067 |
| | | | 307/99 |
| 2010/0148580 A1* | 6/2010 | Taniuchi | H02J 1/102 |
| | | | 307/29 |
| 2012/0146731 A1* | 6/2012 | Khesbak | H03F 1/0222 |
| | | | 330/295 |
| 2013/0194010 A1* | 8/2013 | Ueki | H03K 19/0008 |
| | | | 327/143 |
| 2013/0257175 A1* | 10/2013 | Yoshida | H02J 4/00 |
| | | | 307/109 |
| 2013/0271224 A1* | 10/2013 | Puliafico | H03F 3/19 |
| | | | 330/296 |

FOREIGN PATENT DOCUMENTS

| | | |
|---|---|---|
| JP | S63-093736 U | 6/1988 |
| JP | 8-205398 A | 8/1996 |
| JP | H11-318080 A | 11/1999 |
| JP | 2002258687 A | 9/2002 |
| JP | 2011234481 A | 11/2011 |
| JP | 2013-172493 A | 9/2013 |

* cited by examiner

DISCHARGE CIRCUIT, INFORMATION PROCESSING APPARATUS, DISCHARGE METHOD, AND STORAGE MEDIUM

BACKGROUND OF THE INVENTION

Field of the Invention

The present invention relates to a discharge circuit, an information processing apparatus, a discharge method, and a storage medium.

Description of the Related Art

Conventionally, a stabilization circuit that stabilizes a power source voltage by connecting a capacitor between a power source and ground is widely known. For example, a circuit, which stabilizes a power source voltage by connecting a smoothing capacitor between a power source and ground at a final stage of an AC-DC power source circuit or a DC-DC power source circuit to make a non-DC component of the power source voltage flow to the ground, is known.

Further, for example, there is a known circuit which stabilizes a power source voltage by connecting a decoupling (bypass) capacitor between a power source of a connector and ground, and reducing a characteristic impedance of a power source line thereof to absorb fluctuations of a power source voltage due to disturbance noises.

Furthermore, for example, there is also a known circuit which stabilizes a power source voltage by arranging a decoupling capacitor near a semiconductor element, of which current consumption fluctuates, such as a transistor or a semiconductor element, to supply current upon fluctuations of the current consumption and to absorb switching noises of the semiconductor element.

In addition, Japanese Patent Application Laid-Open No. 8-205398 discusses a configuration in which a large-capacitance capacitor is connected between a power source and ground so that the capacitor supplies current in place of a power source upon instantaneous interruption of the power source. Japanese Patent Application Laid-Open No. 8-205398 discusses a discharge circuit in which a switching element and a resistor are connected in series, the discharge circuit being in parallel with the capacitor connected between the power source and ground. According to Japanese Patent Application Laid-Open No. 8-205398, when power is supplied, the switching element is turned off and the capacitor is charged. When the capacitor unit is removed, the switching element is turned on and charges stored in the capacitor are discharged to ground via the switching element and the resistor.

In the case where the configuration of Japanese Patent Application Laid-Open No. 8-205398 is applied to a device, such as a multifunction peripheral (MFP), from which the capacitor unit cannot be removed, it is desirable that the discharge circuit is subjected to OFF/ON control in conjunction with the ON/OFF control of the power source circuit. Further, though Japanese Patent Application Laid-Open No. 8-205398 discusses a configuration in which one discharge circuit is provided, it is desirable, in a device including a plurality of circuits, that discharge circuits are connected to power sources of the circuits, respectively. For example, conventionally, such a configuration that a plurality of power sources such as a core power source and an IO power source are input to one semiconductor element has been known.

In recent years, as semiconductor processes have been more finely divided, timing conditions for power supply and cutoff to a semiconductor element have become stricter. In addition, as MFPs have become highly functional, circuits have been complicated and timing conditions for power supply and cutoff among circuits have become stricter. Therefore, power cutoff timing control of each power source is important.

However, the above-described prior art technique has a following problem: when a power source voltage or current supplying ability with respect to circuits installed in a power source device for controlling discharge circuits or with respect to the discharge circuits decreases, the discharge circuits do not operate.

Figure 6:
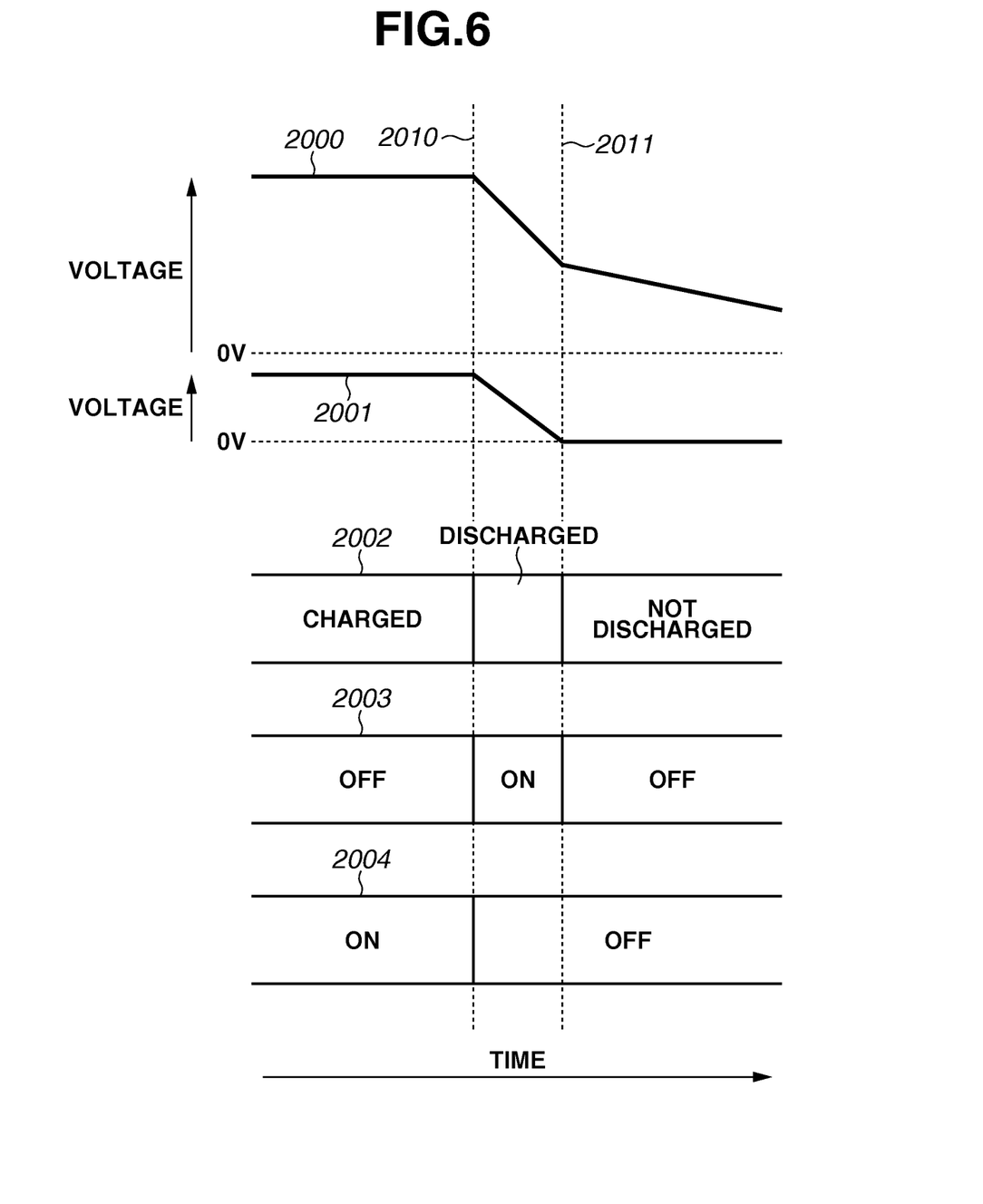
FIG. 6 is a timing chart for explaining operations of a conventional discharge circuit.

FIG. 6 is a timing chart illustrating conventional power cutoff timings.

In FIG. 6, a horizontal axis indicates time, and a vertical axis indicates voltage. A power source line 2000 indicates a waveform of a power source voltage discharged by a discharge circuit. A power source line 2001 indicates a waveform of a power source voltage for a circuit that performs ON/OFF control with respect to the discharge circuit. For convenience of explanation, the following refers to a case of a MFP as an example, as described below, assuming that the power source line 2001 indicates a power source that supplies power in a low power mode with a smaller power consumption than usually. A power source line 2002 indicates a state of the discharge circuit.

[Before Time 2010]

The power source line 2000 and the power source line 2001 are in a steady state in which power is continuously supplied. Respective capacitors connected between the power source line 2000 and ground, and between the power source line 2001 and ground have already been charged.

[From Time 2010 to Time 2011]

Upon the start of power source cutoff at time 2010, regarding the power source line 2000, the capacitor that will be described below is discharged by the discharge circuit, and the voltage starts decreasing. Regarding the power source line 2001, the capacitor that will be described below is discharged by current consumption by a load (such as a semiconductor element) that will be described below, and the voltage starts decreasing.

[After Time 2011]

All of AC-DC power sources that are to be described below are continuously cut off. The voltage of the power source for the circuit for controlling the discharge circuit decreases, and the discharge circuit does not operate. When the voltage of the power source line 2001 decreases, the discharge circuit becomes unable to operate, as indicated by 2002.

In the case where a large-capacitance capacitor is connected to the power source line 2000, the decrease of the voltage of the power source line 2000 takes time. For example, for power source stability, a large-capacitance capacitor is connected to a power source that is connected to a mechanism consuming much current such as a heater, a motor, a laser, etc. of an MFP, or a semiconductor element in which current consumption largely fluctuates, such as an image processing circuit. In this case, since power is not supplied to the mechanism consuming much current or the semiconductor element when the power source is cut off, the discharge of the large-capacitance capacitor takes much time.

The following describes details of a state in which the discharge circuit becomes unable to operate (after the time 2011).

For example, in the case where the switching element of Japanese Patent Application Laid-Open No. 8-205398 is formed with a field effect transistor (FET), when a gate voltage Vgs of the FET becomes below a threshold value Vth, drain current stops flowing, and the discharge circuit does not operate. In other words, this disables the power cutoff timing control by a plurality of discharge circuits.

If charges in a capacitor between a power source and ground are not discharged sufficiently, the voltage of the power source does not decrease sufficiently upon the power source cutoff. If the power source is turned on again before the voltage of the power source decreases sufficiently, transition occurs from the middle of power cutoff timing to the middle of the power supply timing. Accordingly, a power-on reset circuit does not operate, which causes the circuit to malfunction.

Further, upon power source cutoff, a signal is input to a circuit to which power is not supplied from a circuit to which power is supplied, power is supplied in a pseudo manner via a parasitic element from a signal line, and a semiconductor element deteriorates. In some cases, the worst happens such as breakdown of a semiconductor element caused by overcurrent that is significantly beyond drive capability of the semiconductor element, or by latchup.

SUMMARY OF THE INVENTION

The present invention provides a mechanism that, even in the case where a power source that is charging a capacitor connected between a power source line and ground is cut off, can cause an operation for discharging charges stored in the capacitor to be executed with a simple circuit configuration.

According to an aspect of the present invention, a discharge circuit for a decoupling capacitor to stabilize a voltage supplied from a first power supply unit to a first load includes a first capacitor configured to be charged by power supplied from a second power supply unit that supplies power to a second load that is different from the first load, a first switch configured to be arranged between the decoupling capacitor and ground, and a discharge control circuit configured to discharge, in a case where power supplied from the second power supply unit to the second load is cut off, charges of the decoupling capacitor to the ground by driving the first switch using charges stored in the first capacitor.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

<Description of System Configuration>

The following describes an exemplary device to which a discharge circuit is applied according to a first exemplary embodiment, referring to an exemplary apparatus having a plurality of power sources, for example, a multifunction peripheral (MFP).

Figure 1:
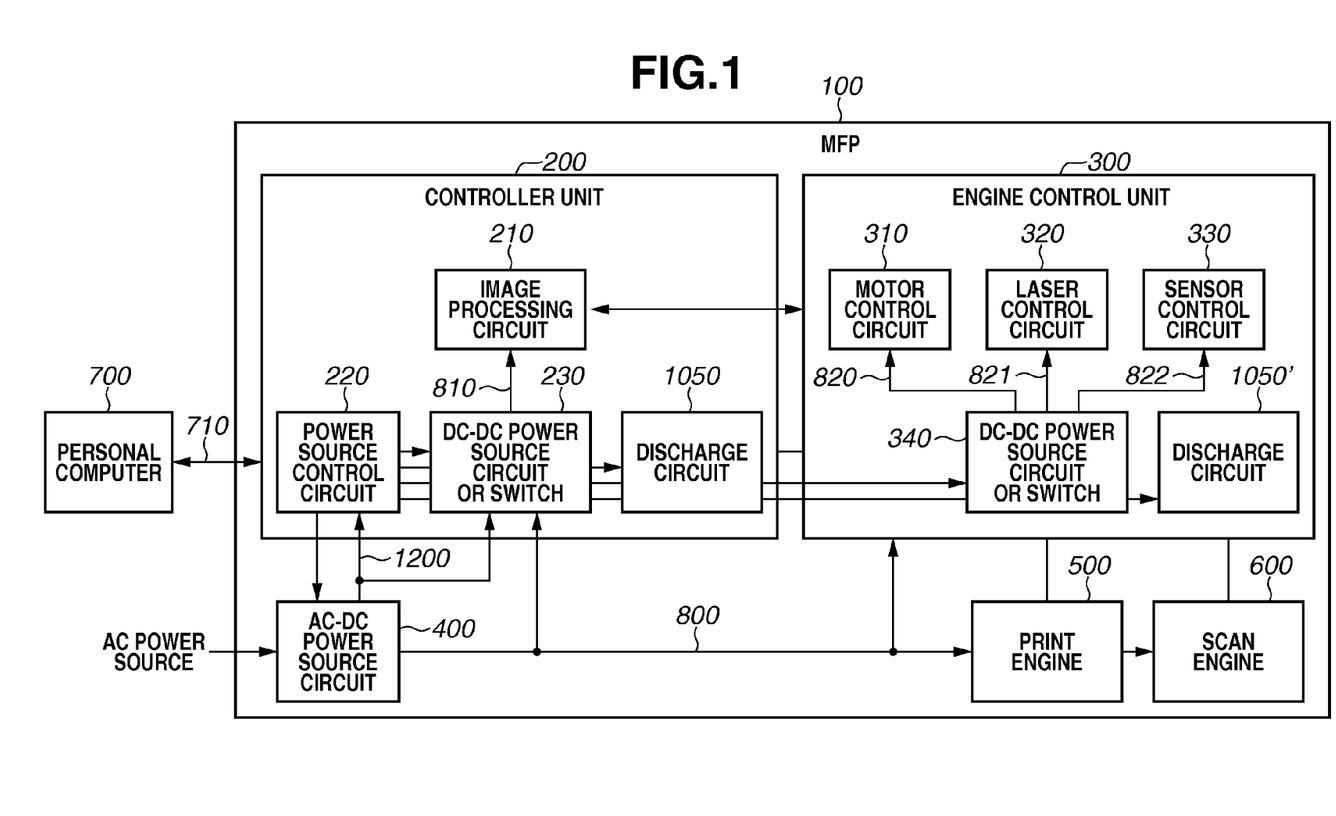
FIG. 1 is an exemplary block diagram illustrating a configuration of an image processing apparatus to which a discharge circuit is applied.

FIG. 1 is an exemplary block diagram illustrating a configuration of an image processing apparatus to which discharge circuit is applied according to the present embodiment.

As illustrated in FIG. 1, an MFP 100 as a device that performs functional processing operations such as copying, printing, scanning and the like includes a scan engine 600, and a print engine 500. An information processing apparatus 700 (personal computer) is communicably connected to the MFP 100 via a network 710 or the like. The network 710 is a communication path such as a LAN, a USB, a wireless LAN, or the like that connects the MFP 100 and the personal computer 700.

The following describes an internal configuration of the MFP 100.

A controller unit 200 controls transmission/reception of an image with a network, generation of a print image for laser drawing, generation of a scanned image fed from a scanner sensor, and the entirety of the MFP.

An engine control unit 300 controls the print engine 500 and the scan engine 600.

An AC-DC power source circuit 400 converts AC power from an AC power source, such as a commercial power supply, to DC power. The print engine 500 performs printing with respect to a print medium such as a sheet. The scan engine 600 reads an image on a print medium such as a sheet, and converts the same into electronic data (image data).

A power source line 800 is cut off in a low power mode that will be described below, and for convenience of explanation, it is assumed that, as an example illustrated herein, the power source line 800 supplies power to the controller unit 200, the engine control unit 300, the print engine 500, and the scan engine 600. A power source line 1200 supplies power in a lower power mode that will be described below, and for convenience of explanation, it is assumed, as an example illustrated herein, that the power source line 1200 supplies power to a power source control circuit 220 and a DC-DC power source circuit 230 that will be described below.

The following describes an internal configuration of the controller unit 200.

An image processing circuit 210 performs image processing during printing or scanning. The power source control circuit 220 controls an AC-DC power source circuit and a DC-DC power source circuit that will be described below. The DC-DC power source circuit 230 increases/decreases a direct current voltage generated by the AC-DC power source circuit, so as to convert the same into another direct current voltage. Here, the DC-DC power source circuit 230 may be replaced with a switching element that supplies/cuts off the direct current voltage generated by the AC-DC power source circuit or the DC-DC power source circuit.

A power source line 810 is a power source generated by the DC-DC power source circuit 230, and for convenience of explanation, it is assumed that power thereof is supplied to the image processing circuit 210. A discharge circuit 1050 discharges the power source line 800 or the power source line 810.

The following describes an internal configuration of the engine control unit 300.

A motor control circuit 310 controls a motor (not shown) of the print engine 500, the scan engine 600, or the like. A laser control circuit 320 controls a laser (not shown) of the print engine 500. A sensor control circuit 330 controls a sensor (not shown) of the scan engine 600 and the like.

A DC-DC power source circuit 340 increases/decreases a direct current voltage generated by the AC-DC power source circuit, and converts the same into another direct current voltage. Here, the DC-DC power source circuit 340 may be replaced with a switching element that supplies/cuts off the direct current voltage generated by the AC-DC power source circuit or the DC-DC power source circuit. Power source lines 820 to 822 are generated by the DC-DC power source circuit 340. A discharge circuit 1050' discharges the power source line 800 or the power source lines 820 to 822.

In recent years, the MFP has a low power mode for cutting off power sources for a part of circuits such as the engine control unit 300, the print engine 500, the scan engine 600, and the image processing circuit 210 so as to reduce power consumption when a user does not use the MFP for a long time.

The power source control circuit 220 controls operations so that the operations should be performed using power sources that supply power in a low power mode. The power source control circuit 220 switches cutoff or power supply of the AC-DC power source circuit 400 and the DC-DC power source circuits or the switching elements 230 and 340, and controls discharge by the discharge circuits 1050 and 1050'.

Generally, from the viewpoint of power source stabilization, a capacitor having a small electrostatic capacitance is connected to a circuit consuming small power, and a capacitor having a large electrostatic capacitance is connected to a circuit consuming large power.

In the case of a power source that supplies power in a low power mode, current consumption is very small. Conventionally, as illustrated in FIG. 6, in the case where a capacitor having a relatively small capacitance is connected to a power source that supplies power in a low power mode, the power source cutoff speed becomes fast.

In the case of an engine control circuit of the MFP, which controls a mechanism that consumes much current such as a heater, a motor, or a laser, current consumption is large. For power source stabilization of an engine processing circuit, a capacitor having a relatively large capacitance is connected between a power source and ground, which causes the power source cutoff to take time.

Likewise, in the case of an image processing circuit, in which many transistors are provided in a semiconductor element and an operation frequency is high, current consumption is large. Therefore, for power source stabilization of the image processing circuit, a capacitor having a relatively large capacitance is connected between a power source and ground, which, in general, causes the power source cutoff to take time.

If a power source that supplies power in a low power mode of the power source control circuit is cut off before a power source of a circuit such as the engine control unit 300 or the controller unit 200 is cut off, then, a discharge circuit that discharges the power source of the engine control unit 300 or the controller unit 200 stops operating. Therefore, requirements for the power cutoff timing are not satisfied, and there is concern that circuit deterioration or breakdown could occur.

The power consumption of a power source circuit of the MFP, as well as circuits such as a heater, a motor, a laser, and an image processing circuit varies with a device type. In addition, the configuration of the MFP varies; in some configurations, a variety of function expansion units such as a facsimile and a unit for wireless communication are connected, while in other configurations, the same are not connected. In such an infinite number of combinations of these function expansion units, the power cutoff timing requirements should be satisfied.

Conventionally, in order to satisfy the power cutoff timing requirements in a variety of device types with a variety of function expansion units, the power supply timing has to be controlled depending on the device type. Therefore, it is very difficult to commonalize a power source control circuit and a discharge circuit.

In the present exemplary embodiment, the discharge circuit 1050 is supplied with power from a capacitor. Therefore, without depending on a variety of device types and without depending on a variety of function expansion units, the discharge circuit 1050 continues discharging, even after a power source for the power source control circuit 220 such as the AC-DC power source circuit 400 and the power source that supplies power in a low power mode is cut off. Details of the same will be described below.

Figure 2:
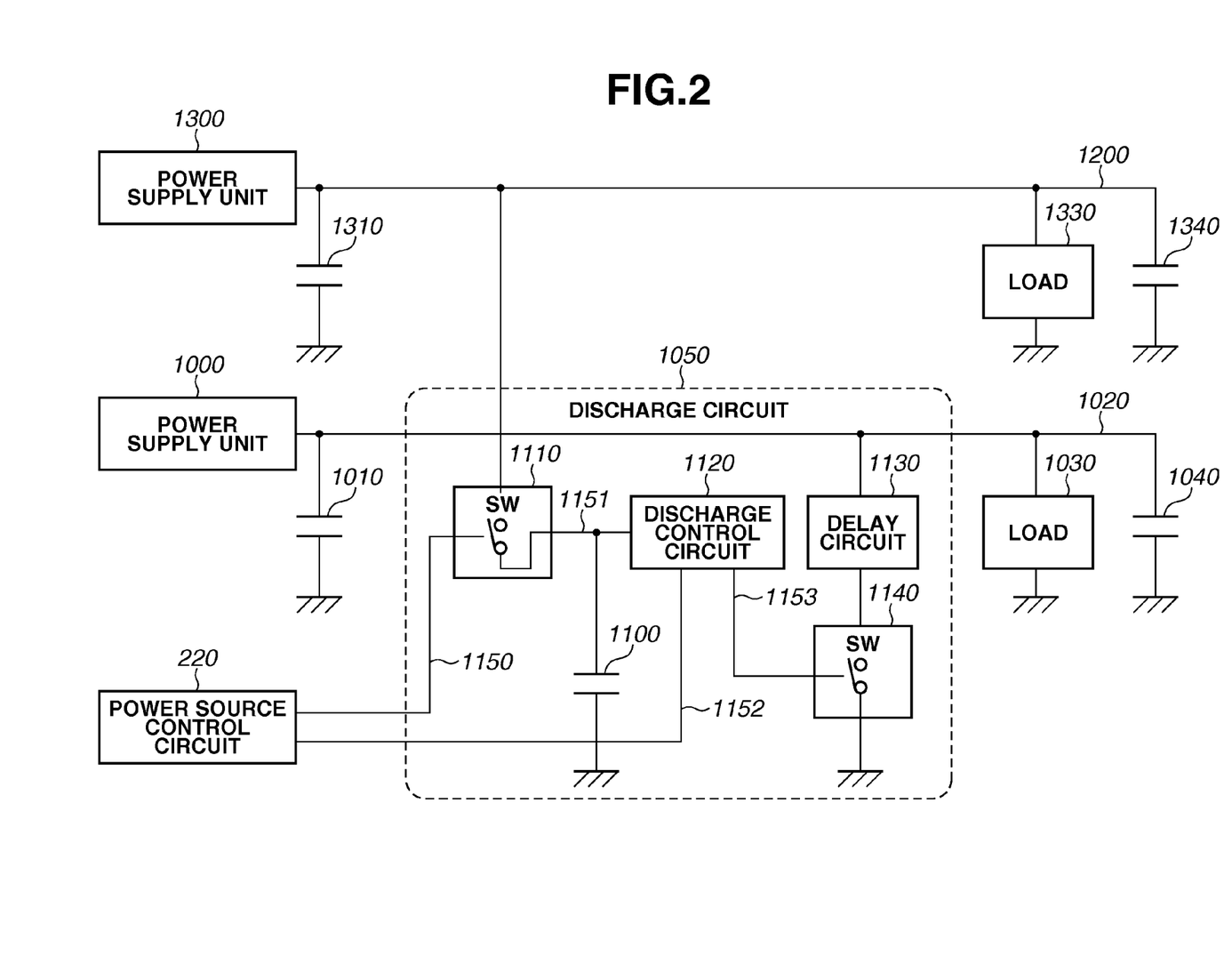
FIG. 2 is an exemplary block diagram illustrating an example of a discharge circuit of a present exemplary embodiment.

FIG. 2 is an exemplary block diagram illustrating an example of a discharge circuit according to the present exemplary embodiment.

In FIG. 2, a power supply unit 1000 supplies power in a normal power state, and is formed with the following circuit, element, or the like: a power source circuit such as an AC-DC power source circuit that converts a commercial power supply to direct current, or a DC-DC power source circuit that increases/decreases a direct current voltage generated by the AC-DC power source circuit so as to convert the same into another direct current voltage; or a switching element such as a relay, a diode, a bipolar transistor, an FET, or the like for switching a direct current voltage. The power supply unit 1000 is cut off in a low power mode.

A first capacitor 1010 is a smoothing capacitor or the like for stabilizing a power source voltage of the power supply unit 1000, and is connected between a power source and ground. A direct current power source line 1020 is output by the power supply unit 1000, and its voltage is stabilized by the first capacitor 1010. The direct current power source line 1020 corresponds to the power source lines 800, 810, 820, 821, and 822 illustrated in FIG. 1.

A load 1030 is connected to the power source line 1020, and during operation, current flows from the power source line 1020 via the load 1030 to the ground. In the description of the present exemplary embodiment, for convenience of explanation, it is assumed that the load 1030 is the print engine 500, the scan engine 600, the image processing circuit 210, the motor control circuit 310, the laser control circuit 320, or the sensor control circuit 330.

A second capacitor 1040 is a decoupling capacitor of the load 1030 or the like connected between a power source and ground. For example, in the case where the load 1030 is the print engine 500, as large current flows through the print engine 500, the capacitor 1040 is a capacitor having a large electrostatic capacitance for stabilizing the power source 1020.

Generally, with the same current, the larger an electrostatic capacitance of a capacitor, the more the discharge takes time. The power source cutoff for the motor control circuit 310 and the laser control circuit 320 is delayed as compared with the power source cutoff for the print engine 500, so that the motor control circuit 310 and the laser control circuit 320 are prevented from being supplied in a pseudo manner with power from a signal (not shown) for controlling the print engine 500, whereby malfunction and breakdown of the motor control circuit 310 and the laser control circuit 320 are prevented.

Here, in the present exemplary embodiment, the predetermined load 1030 is not limited to the print engine 500, but the load 1030 may be the engine control unit 300. In the case where the load 1030 is the engine control unit 300, pseudo power source supply from a signal line between the same and the image processing circuit 210 is prevented, whereby malfunction and breakdown of the engine control unit 300 and the image processing circuit 210 are prevented. In order to prevent such malfunction and breakdown, in the present exemplary embodiment, a discharge circuit is used for controlling the power cutoff timing.

A discharge circuit 1050 discharges charges stored in the capacitor 1010 and the capacitor 1040. Here, for convenience of explanation, it is assumed that one load 1030 and one capacitor 1040 are provided, but needless to say, a plurality of loads 1030 may be provided. In the case where a plurality of loads 1030 are provided, each one of capacitors 1040 is connected to each of the loads 1030, and the capacitors 1040 are arranged near the loads 1030, respectively, on a substrate.

Hereinafter, an exemplary configuration of the discharge circuit 1050 illustrated in FIG. 2 is described.

A third capacitor 1100 is provided. A first switching element 1110 is connected to a power source line 1151, so as to charge the third capacitor 1100 connected between one end of the first switching element 110 and ground. A discharge control circuit 1120 is driven by the third capacitor 1100, and includes a third switching element inside thereof, so as to drive a second switching element 1140 which will be described below.

A delay circuit 1130 delays discharge of the first capacitor 1010 and the second capacitor 1040. The second switching element 1140 is formed with a relay, a diode, a bipolar transistor, an FET, or the like that discharges the first capacitor 1010 and the second capacitor 1040. A power source line 1200 supplies power in a low power mode. In addition, the capacitance of the second capacitor 1040 is determined depending on the capacitance of the load 1030 and the first capacitor 1010.

A power supply unit 1300 supplies power in a low power state. The power supply unit 1300 includes the following circuit, element, or the like: a power source circuit such as an AC-DC power source circuit that converts the commercial power supply to direct current, or a DC-DC power source circuit that increases/decreases a direct current voltage generated by an AC-DC power source circuit so as to convert the same into another direct current voltage; or a switching element such as a relay, a diode, a bipolar transistor, an FET, or the like for switching a direct current voltage. The power supply unit 1300 thereby provides the power source line 1200 that supplies power in a low power mode.

A capacitor 1310 operates as a smoothing capacitor for stabilizing a power source voltage of the power supply unit 1300 that supplies power in a low power state. The capacitor 1310 is connected between the power source line 1200 and ground.

A control signal 1150 controls an ON-OFF state of the first switching element 1110 that is controlled by the power source control circuit 220. For convenience of explanation, in the present exemplary embodiment, it is assumed that the first switching element 1110 is turned on when the control signal 1150 is at a high level, and the first switching element 1110 is turned off when the control signal 1150 is at a low level.

As the power source control circuit 220 operates with power supplied from the second power source, when the voltage of the second power source decreases, the control signal 1150 cannot be controlled by the power source control circuit 220. Here, in the case where the first switching element 1110 is a two-terminal element such as a diode, the control signal 1150 is unnecessary.

To one end of the power source line 1151, the capacitor 1100 is connected, so that the capacitor 1100 is charged by the power source 1300 via the switching element 1110. This makes it possible to drive the discharge control circuit 1120 when the power supply unit 1000 is cut off.

A control signal 1152 is a control signal for the discharge control circuit 1120 controlled by the power source control circuit 220. For convenience of explanation, it is assumed in the present exemplary embodiment, as one example, that the control signal 1152 is a negative logical signal, the discharge control circuit 1120 prevents the capacitor 1040 from being discharged when the control signal 1152 is at a high level, and the discharge control circuit 1120 causes the capacitor 1040 to be discharged when the control signal 1152 is at a low level.

In the discharge circuit 1050, the control circuit for driving the second switching element 1140 is driven by the second capacitor 1100, whereby the discharge control circuit 1120 and the second switching element 1140 are continuously driven even after a power source (power supply unit 1000) that supplies power in a normal state is cut off.

First, the following describes a charging operation of the second capacitor 1100.

The second capacitor 1100 of the discharge circuit 1050 is charged when a power source supplies power, for example, during printing by the MFP or when the MFP is in a stand-by state.

Next, the following describes a discharging operation of the second capacitor 1100.

The second capacitor 1100 supplies a voltage and current to the second switching element 1140. By doing so, charges of the capacitor 1010 and the capacitor 1040 are discharged, whereby the voltage of the power source line 1020 can be sufficiently decreased.

Here, for convenience of explanation, it is assumed that the delay circuit 1130 is connected to the power source line 1020, but the configuration is not necessarily limited to this configuration. Needless to say, the second switching element 1140 may be connected to the power source line 1020, and the delay circuit 1130 may be connected between the second switching element 1140 and ground.

Figure 3:
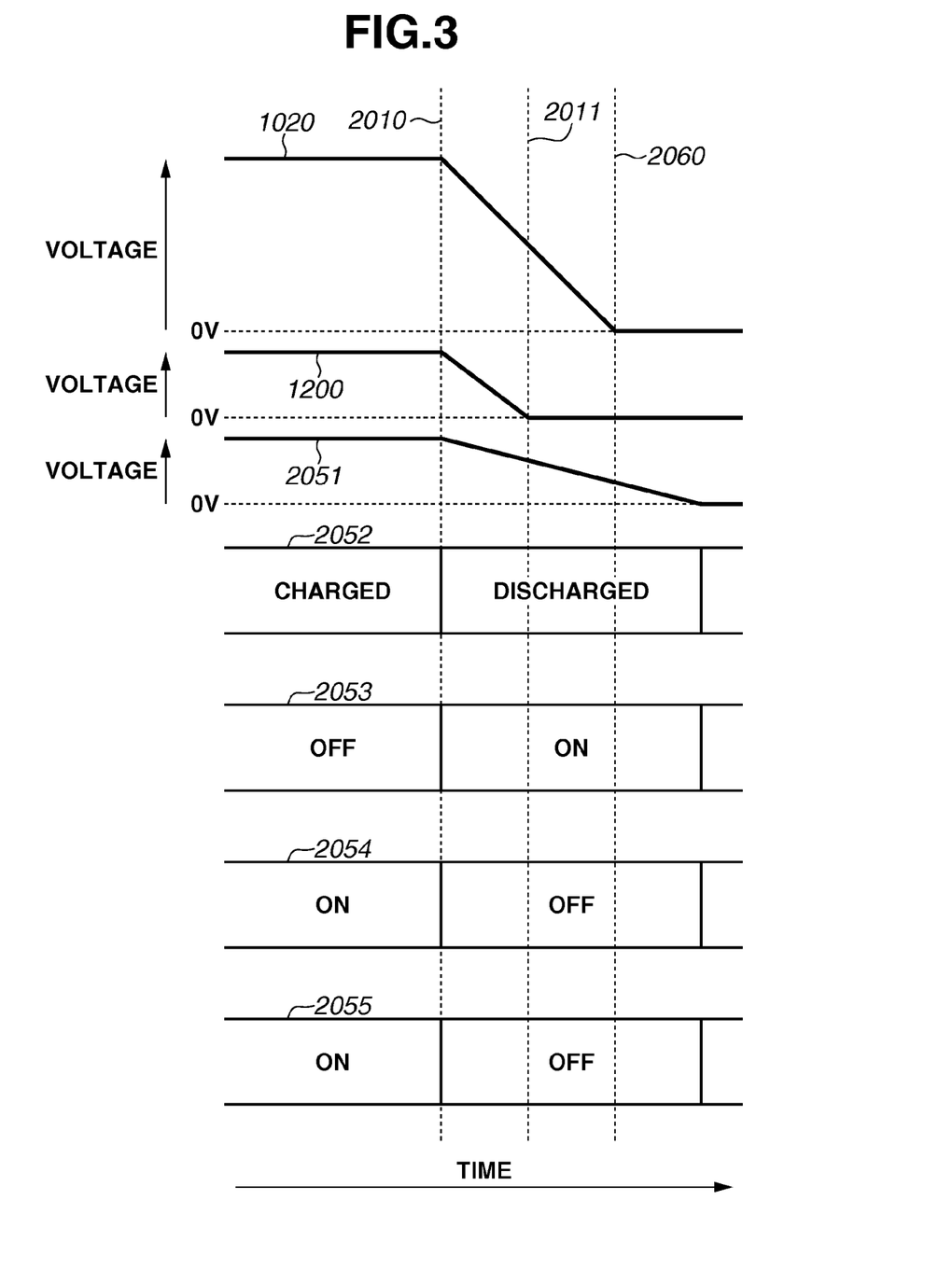
FIG. 3 is a timing chart for explaining operations of a discharge circuit.

FIG. 3 is a timing chart illustrating a driving control operation of the discharge circuit of the present exemplary embodiment. This exemplary timing chart illustrates an operation state in the discharge circuit at power cutoff timing. A horizontal axis indicates time.

In FIG. 3, a power source line 1020 corresponds to a voltage of the power source line 1020 to which the capacitor 1010 and the capacitor 1040 are connected. A power source line 1200 corresponds to a voltage of the power source line 1200 to which the switching element 1110 is connected. A voltage 2051 corresponds to the voltage of the signal line 1151 of the control circuit.

A charge/discharge state 2052 of the discharge control circuit 1120 is a charge/discharge state that is controlled by the discharge control circuit 1120, which is schematically illustrated in the chart. An ON-OFF state 2053 is an ON-OFF state of the second switching element 1140, which is schematically illustrated in the chart. An ON-OFF state 2054 is an ON-OFF state of the third switching element provided inside the discharge control circuit 1120, which is schematically illustrated in the chart. Details of the third switching element provided inside the discharge control circuit 1120 are to be described below. An ON-OFF state 2055 is an ON-OFF state of the first switching element 1110 that charges the capacitor 1100 provided inside the discharge circuit 1050. The ON-OFF state is schematically illustrated in the chart.

[Before Time 2010]

Since a power source is supplied from the power supply unit 1000 to the power source line 1020, the power source line 1020 has a voltage in a steady state. Since a power source is supplied from the power supply unit 1300 to the power source line 1200, the power source line 1200 has a voltage in a steady state. Since a power source is supplied from the power supply unit 1300 via the switching element 1110 to the signal line 1151 of the control circuit, the signal line 1151 of the control circuit has a voltage in a steady state.

The charge/discharge state 2052 of the discharge control circuit 1120 is assumed to be in a state of charging the capacitor 1010 and the capacitor 1040. Here, the ON-OFF state 2053 of the second switching element 1140 is an OFF state, which does not allow the capacitor 1010 and the capacitor 1040 to be discharged. Further, the ON-OFF state 2054 of the third switching element included inside the discharge control circuit 1120 is an ON state. In addition, the ON-OFF state 2055 of the first switching element 1110 shifts to an ON state, which causes the capacitor 1100 to be charged.

[From Time 2010 to Time 2011]

When the power source cutoff starts at time 2010, regarding the power source line 1020, the capacitor 1010 and the capacitor 1040 are discharged by the second switching element 1140, and the voltage of the power source line 1020 starts decreasing. Further, regarding the power source line 1200, the capacitor 1310 and the capacitor 1340 are discharged by current consumption by the load 1330, and the voltage of the power source line 1200 starts decreasing. Power is not supplied to the signal line 1151 of the control circuit, since the switching element 1110 is cut off. The signal line 1151 of the control circuit supplies power to the discharge control circuit 1120, and the voltage thereof gradually decreases for the supply of power.

Here, the charge/discharge state 2052 caused by the discharge control circuit 1120 is a state in which the capacitor 1010 and the capacitor 1040 are discharged. The ON-OFF state 2053 of the second switching element 1140 is a state in which the second switching element 1140 is in an ON state, which causes the capacitor 1040 to be discharged. The ON-OFF state 2054 of the third switching element is a state in which the third switching element is in an OFF state. The ON-OFF state 2055 of the first switching element 1110 is a state in which the first switching element is in an OFF state, which does not cause the capacitor 1100 to be charged.

[After Time 2011]

The discharge control circuit 1120 is driven by the capacitor 1100, and continuously causes the capacitor 1010 and the capacitor 1040 to be discharged. As illustrated in the ON-OFF state 2053 of the second switching element 1140, the second switching element 1140 continuously remains in an ON state. Even after the voltage of the power source line 1200 decreases, charges of the power source line 1151 to which the capacitor 1100 is connected are continuously discharged, and therefore the voltage of the power source line 1051 gradually decreases.

Here, the ON-OFF state 2054 of the third switching element included inside the discharge control circuit 1120 is an OFF state. Further, the ON-OFF state 2055 of the first switching element 1110 of the discharge circuit 1150 remains an OFF state, which does not cause the capacitor 1100 to be charged.

Figure 4:
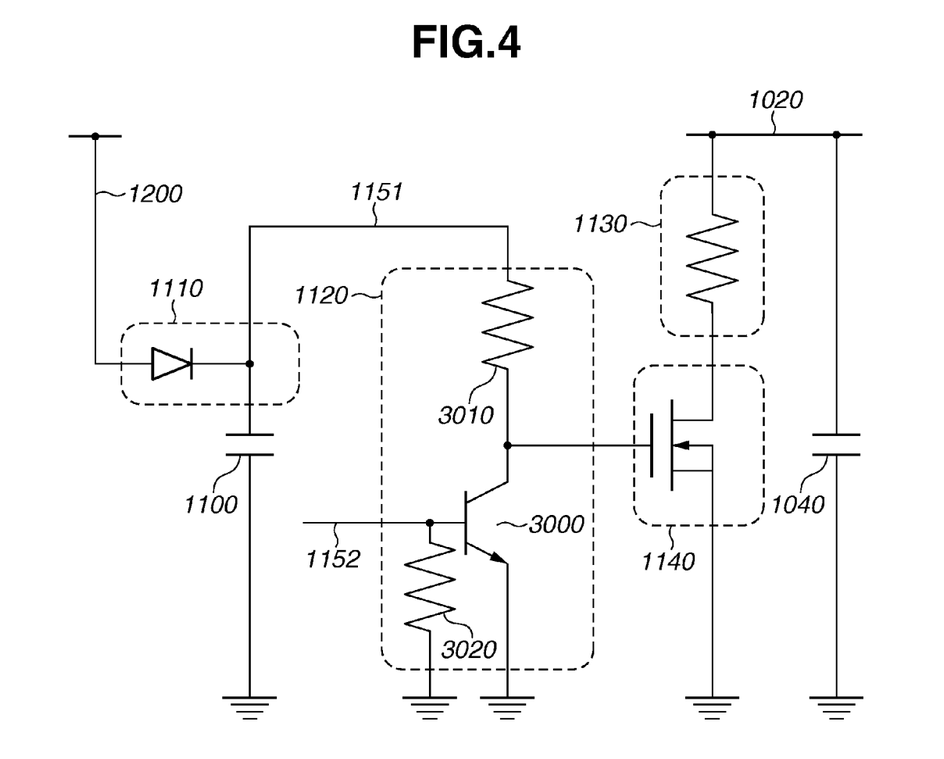
FIG. 4 is a circuit diagram illustrating a configuration of a discharge circuit.

FIG. 4 illustrates a configuration of the discharge circuit according to the present exemplary embodiment. This example has a configuration in which the switch element 1140 illustrated in FIG. 4 is formed with an n-type metal oxide semiconductor field effect transistor (n-MOSFET).

In FIG. 4, the second capacitor 1100 is charged by a diode 1110 that functions as the first switching element. The diode 1110 allows the second capacitor 1100 to be charged while power is supplied to the delay circuit 1130 formed with a resistor, without control of the control signal 1151.

The discharge control circuit 1120 is formed with a third switching element 3000, for example, an NPN bipolar transistor 3000, a resistor 3010, and a resistor 3020. The control signal 1152 is driven to the high level by the power source control circuit 220 before time 2010 illustrated in FIG. 3, and is driven to the low level via the resistor 3020 after the power source cutoff, in other words, after time 2010 illustrated in FIG. 3.

After the power source line 1200 is cut off, in other words, after time 2010 illustrated in FIG. 3, as illustrated in the ON-OFF state 2054, the NPN transistor 3000 becomes in an OFF state. The delay circuit 1130 is formed with a resistor, and has a time constant owing to a resistance value of the capacitor 1040 and the resistor. The second switching element 1140 is formed with an n-MOSFET.

After the power source line 1200 is cut off, in other words, after time 2010 illustrated in FIG. 3, a gate of the n-MOSFET 1140 is driven via the resistor 3010 at the level of the control signal 1151, and as illustrated in the ON-OFF state 2053 corresponding to the second switching element 1140 illustrated in FIG. 3, the n-MOSFET 1140 becomes in an ON state. Here, no current steadily flows through the diode 1110, the NPN transistor 3000 in an OFF state, and the gate of the n-MOSFET 1140. Therefore, after time 2010 in FIG. 3, the voltage of the power source line 2051 corresponding to the control signal 1151 gradually decreases.

The foregoing description indicates that the second switching element 1140 is formed with an n-MOSFET, but the configuration is not necessarily limited to this. The second switching element 1140 may be any switching element, such as a relay, an NPN transistor, a PNP transistor, an FET, or a diode.

The power source control circuit 220 does not have to continuously keep the control signal 1052 at the low level, and as the control signal 1052 is pulled down by the resistor 3020, the capacitor 1040 can be continuously discharged even after the power source line 1200 in a low power state is cut off.

The foregoing description indicates that the discharge control circuit 1120 is formed with the NPN transistor 3000, but the configuration is not necessarily limited to this. The discharge control circuit may be any switching element, such as a relay, a PNP transistor, an FET, or a diode.

According to the present exemplary embodiment, even if a power source that charges a capacitor connected between a power source line and ground is cut off and transition is made to a low power state, the operation of discharging charges stored in the capacitor can be executed with a simple circuit configuration.

Figure 5:
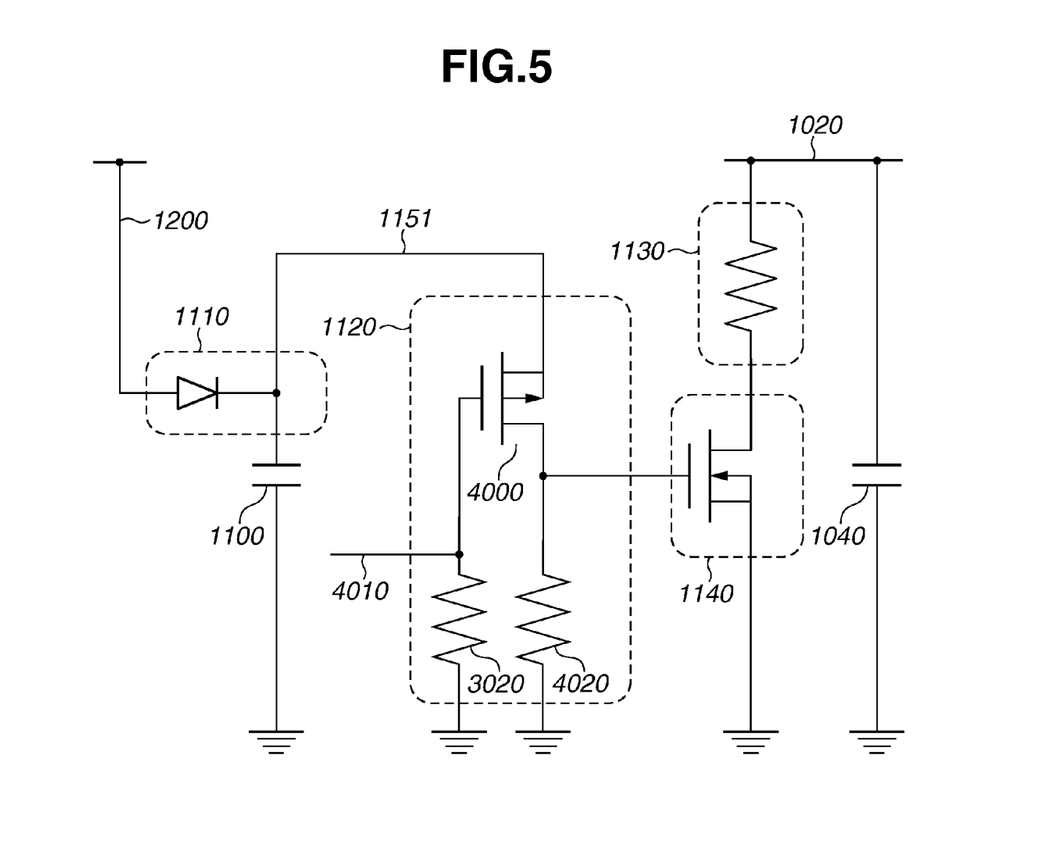
FIG. 5 is a circuit diagram illustrating a configuration of a discharge circuit.

FIG. 5 is a circuit diagram illustrating an exemplary discharge circuit according to a second exemplary embodiment. Parts of the discharge circuit identical to those illustrated in FIG. 4 are indicated by the same reference numerals. In the present example, the control circuit 1120 is formed with a p-MOSFET.

In FIG. 5, the start of discharge of the capacitor 1040 is gradually delayed by a time constant of a gate capacitance of the resistor 1120 and the n-MOSFET 1140. In the present example, the discharge control circuit 1120 uses not the resistor 3010 in FIG. 4 but a p-MOSFET 4000, which causes the discharge of the capacitor 1040 to start more quickly.

The p-MOSFET 4000 is a p-MOSFET of the third switching element, and operations of the same are controlled by a control signal 4010 that is input to the gate thereof. There is provided a resistor 4020. Here, the discharge control circuit 1120 is formed with the p-MOSFET 4000 and the resistor 3020. The following describes operations of the discharge circuit 1050 in FIG. 2 corresponding to the present exemplary embodiment illustrated in FIG. 5.

When the control signal 4010 is at a high level, the p-MOSFET 4000 is in an OFF state, and the resistor 4020 causes the n-MOSFET 1140 to assume an OFF state, whereby the capacitor 1040 is not discharged. When the control signal 4010 is at a low level, the p-MOSFET 4000 assumes an ON state, and a voltage applied to the capacitor 1100 is added to the gate of the n-MOSFET 1140, which causes the n-MOSFET 1140 to assume an ON state, whereby the capacitor 1040 is discharged.

Here, it is not necessary to continuously apply a low level to the control signal 4010. As the control signal 4010 is pulled down by the resistor 3020, the capacitor 1040 can be continuously discharged even after the power source line 1200 is cut off.

As described above, the discharge circuit according to the present exemplary embodiment makes it possible to continuously discharge charges of the capacitor 1010 and the capacitor 1040 even after the power source of the power source line 1200 is cut off, in other words, after time 2010 in FIG. 3, whereby a highly reliable circuit without malfunction or breakdown can be achieved.

Further, even if current consumption of a heater, a motor, a laser and the like of the MFP, and of an image processing circuit varies with their device types, it is unnecessary to tune up constants of a power source, a power source control circuit, or a discharge circuit, since the second switching element continuously operates until the capacitor 1010 and the capacitor 1040 are discharged. Therefore, a configuration that does not depend on device types can be achieved.

Here, for convenience of explanation, the foregoing description refers to an MFP as an exemplary apparatus to which the discharge circuit is applied, but the present invention is not necessarily limited to the MFP. The present invention may be applied to any circuit or apparatus as long as it is a circuit or an apparatus configured so that charges stored in a capacitor are discharged when a power source is cut off.

Further, in the description of each exemplary embodiment, for convenience of explanation, the power source line 1020 and the power source line 1200 are described as different power source lines, but the configuration is not limited to this. The power source line 1020 and the power source line 1200 may be formed with a same power source line.

Still further, the description of each exemplary embodiment refers to the case where the switch 1100 is formed with a capacitor, but the present invention is not limited to this. The switch 1100 may be formed with a battery.

The present invention is not limited to the above-described exemplary embodiments, but the present invention can be modified variously based on the spirit of the present invention (including organic combinations of respective embodiments), and such modifications are not excluded from the scope of the present invention.

According to the present invention, even in the case where a power source that is charging a capacitor connected between a power source line and ground is cut off, an operation for discharging charges stored in the capacitor can be executed with a simple circuit configuration.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-247400 filed Nov. 29, 2013, which is hereby incorporated by reference herein in its entirety.

What is claimed is:

1. A discharge apparatus for discharging power charged in a decoupling capacitor of a load, the discharge apparatus comprising:
    a power supply unit;
    a first switch which is arranged between the decoupling capacitor and ground;
    a power control circuit which outputs a control signal;
    a discharge control circuit which outputs a discharge signal for controlling the first switch in accordance with input of the control signal, wherein the power charged in a decoupling capacitor is discharged to the ground by controlling the first switch; and
    a first capacitor which is charged with power supplied from the power supply unit and supplies the charged power to the discharge control circuit,
    wherein the discharge control circuit, to which the charged power in the first capacitor is supplied, outputs the discharge signal in accordance with the input of the control signal.

2. The discharge apparatus according to claim 1, further comprising a delay circuit which is arranged between the decoupling capacitor and the first switch.

3. The discharge apparatus according to claim 1, wherein the discharge control circuit includes a field effect transistor (FET) and a resistance which are arranged between the first capacitor and ground, and wherein one end of a line for outputting the discharge signal is connected between the FET and the resistance, and the other end of the line is connected to the first switch.

4. The discharge apparatus according to claim 1, further comprising a diode which is arranged between the power supply unit and the first capacitor.

5. The discharge apparatus according to claim 3, wherein the power control circuit outputs the control signal to the FET.

6. The discharge apparatus according to claim 1, wherein a capacitance of the first capacitor is determined based on the load and a capacitance of the decoupling capacitor.

7. An information processing apparatus comprising:
a first power supply unit;
a first load to which power is supplied from the first power supply unit;
a second power supply unit;
a second load to which power is supplied from the second power supply unit;
a decoupling capacitor of the first load;
a power control circuit which outputs a control signal; and
a discharge circuit which discharges power charged in the decoupling capacitor to ground, wherein the discharge circuit includes:
a first switch which is arranged between the decoupling capacitor and the ground,
a discharge control circuit which outputs a discharge signal for controlling the first switch in accordance with input of the control signal, wherein the power charged in the decoupling capacitor is discharged to the ground by controlling the first switch, and
a first capacitor which is charged with power supplied from the second power supply unit and supplies the charged power to the discharge control circuit,
wherein the discharge control circuit, to which the charged power in the first capacitor is supplied, outputs the discharge signal in accordance with the input of the control signal.

8. The information processing apparatus according to claim 7, further comprising a delay circuit which is arranged between the decoupling capacitor and the first switch.

9. The information processing apparatus according to claim 7,
wherein the discharge control circuit includes a field effect transistor (FET) and a resistance which are arranged between the first capacitor and ground, and
wherein one end of a line for outputting the discharge signal is connected between the FET and the resistance, and the other end of the line is connected to the first switch.

10. The information processing apparatus according to claim 7, further comprising a diode which is arranged between the second power supply unit and the first capacitor.

11. The information processing apparatus according to claim 9, wherein the power control circuit outputs a control signal to the FET.

12. The information processing apparatus according to claim 7, wherein a capacitance of the first capacitor is determined based on the first load and a capacitance of the decoupling capacitor.

13. A method for a discharge circuit, wherein the discharge circuit is for a decoupling capacitor to stabilize a voltage supplied from a first power supply unit to a first load and includes a first switch arranged between the decoupling capacitor and ground, the method comprising:
charging a first capacitor with power supplied from a second power supply unit that supplies power to a second load that is different from the first load;
supplying the charged power in the first capacitor to a discharge control circuit;
inputting a control signal to the discharge control circuit;
outputting, from the discharge control circuit to which the charged power in the first capacitor is supplied, a discharge signal; and
discharging a charged power in the decoupling capacitor to the ground in accordance with input of the discharge signal.

* * * * *